(12) United States Patent
Fukumura

(10) Patent No.: US 7,950,485 B2
(45) Date of Patent: May 31, 2011

(54) CONTROL DEVICE FOR HYBRID VEHICLE

(75) Inventor: Mitsumasa Fukumura, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 385 days.

(21) Appl. No.: 12/265,954

(22) Filed: Nov. 6, 2008

(65) Prior Publication Data

US 2009/0120700 A1    May 14, 2009

(30) Foreign Application Priority Data

Nov. 8, 2007  (JP) ................................ 2007-290887

(51) Int. Cl.
*B60K 1/00* (2006.01)
*B60K 6/20* (2007.10)

(52) U.S. Cl. ............... 180/65.7; 180/65.21; 180/65.265; 180/170

(58) Field of Classification Search ................. 180/179, 180/170, 65.21, 65.275, 65.265, 65.31, 65.7, 180/65.235, 65.285, 65.6; 903/903, 905, 903/906, 909; 701/22, 95, 84
See application file for complete search history.

(56) References Cited

U.S. PATENT DOCUMENTS

| | | | | |
|---|---|---|---|---|
| 5,967,940 A * | 10/1999 | Yamaguchi | .................... | 903/903 |
| 6,083,138 A * | 7/2000 | Aoyama et al. | .............. | 180/65.7 |
| 6,104,976 A * | 8/2000 | Nakamura | ....................... | 701/95 |
| 6,625,524 B2 * | 9/2003 | Yamaguchi et al. | ............ | 701/22 |
| 6,722,332 B2 * | 4/2004 | Kojima | .................... | 180/65.285 |
| 6,751,960 B2 * | 6/2004 | Arimitsu et al. | ......... | 180/65.235 |
| 6,847,880 B2 * | 1/2005 | Ishizu et al. | .................... | 701/95 |
| 7,056,260 B2 * | 6/2006 | Nakamori et al. | ................ | 477/3 |
| 7,219,757 B2 * | 5/2007 | Tomita et al. | ............ | 180/65.275 |
| 7,555,373 B2 * | 6/2009 | Shimizu et al. | .................. | 701/22 |
| 2007/0056784 A1 * | 3/2007 | Joe et al. | ...................... | 180/65.2 |

FOREIGN PATENT DOCUMENTS

| | | |
|---|---|---|
| JP | 2000-310316 | 11/2000 |
| JP | 2004-345527 | 12/2004 |
| JP | 2006-321488 | 11/2006 |
| JP | 2007-1451 | 1/2007 |
| JP | 2007-284001 | 11/2007 |

\* cited by examiner

*Primary Examiner* — Hau V Phan
(74) *Attorney, Agent, or Firm* — Oblon, Spivak, McClelland, Maier & Neustadt, L.L.P.

(57) ABSTRACT

The control device for the hybrid vehicle is mounted on the hybrid vehicle including the engine and the motor generator as the driving source and capable of switching at least two modes, i.e., the infinite variable speed mode and the fixed gear ratio mode. When the speed change is performed from the infinite variable speed mode to the fixed gear ratio mode, the first speed change control to maintain the number of revolutions equal to or larger than the number of engine revolutions at the time of setting the infinite variable speed mode and reduce the engine torque to shift the speed gear in the fixed gear ratio mode is executed. Thereby, when the speed change is performed from the infinite variable speed mode to the fixed gear ratio mode, it becomes possible to appropriately suppress the drivability deterioration caused due to the change of the number of engine revolutions.

3 Claims, 9 Drawing Sheets

CONTROL DEVICE FOR HYBRID VEHICLE

TECHNICAL FIELD

The present invention relates to a control device preferred for a hybrid vehicle.

BACKGROUND ART

There is known a hybrid vehicle including a power source such as an electromotor and a motor generator, in addition to an engine. In the hybrid vehicle, while the engine operates as efficiently as possible, excess and deficiency of a driving force and an engine braking force are adjusted by the electromotor and/or the motor generator.

As for the above hybrid vehicle, there is disclosed an example of a speed change mechanism capable of operating with switching an infinite variable speed mode and a fixed gear ratio mode in Patent Reference 1. Concretely, a power distribution mechanism including four revolution components is formed by combining two planetary gear mechanisms, and the four revolution components are connected to an engine, a first motor generator, an output axis and a brake, respectively. In such a state that the brake is released, the number of revolutions of the engine continuously changes by continuously changing the number of revolutions of the first motor generator, and the operation in the infinite variable speed mode is executed. Meanwhile, in such a state that the brake is fixed, the gear ratio is fixed by preventing the revolution of one of the above-mentioned revolution components, and the operation in the fixed gear ratio mode is executed. In addition, as the speed change mechanism for switching the infinite variable speed mode and the fixed gear ratio mode, there is known a speed change mechanism which applies not a normal wet multiple disc clutch but an engagement mechanism for engaging teeth of the revolution component and teeth of the fixed component.

[Patent Reference 1] Japanese Patent Application Laid-open under No. 2004-345527

In the technique disclosed in Patent Reference 1, drivability sometimes deteriorates because the number of engine revolutions changes at the time of shifting the speed gear between the infinite variable speed mode and the fixed gear ratio mode. For example, when the speed gear is shifted from the fixed gear ratio mode to the infinite variable speed mode and acceleration is executed, the number of engine revolutions decreases once, and uncomfortable feeling sometimes occurs.

DISCLOSURE OF THE INVENTION

The present invention has been achieved in order to solve the above problem. It is an object of this invention to provide a control device for a hybrid vehicle capable of appropriately suppressing uncomfortable feeling occurring at a time of shifting a speed gear between an infinite variable speed mode and a fixed gear ratio mode.

According to one aspect of the present invention, there is provided a control device for a hybrid vehicle which includes an engine and a motor generator as a driving source, and which switches at least two modes: an infinite variable speed mode; and a fixed gear ratio mode, including: a speed change control unit which executes a first speed change control that maintains a number of revolutions equal to or larger than a number of engine revolutions at a time of setting the infinite variable speed mode, and reduces an engine torque to change to the fixed gear ratio mode, when the speed change is performed from the infinite variable speed mode to the fixed gear ratio mode.

The above control device for the hybrid vehicle includes the engine and the motor generator as the driving source, and is mounted on the hybrid vehicle capable of switching the two modes, i.e., the infinite variable speed mode and the fixed gear ratio mode. Concretely, when the speed change is performed from the infinite variable speed mode to the fixed gear ratio mode, the speed change control unit maintains the number of revolutions equal to or larger than the number of engine revolutions at the time of setting the infinite variable speed mode, and reduces the engine torque to execute the first speed change control for changing to the fixed gear ratio mode. Namely, the speed change is performed with maintaining the number of high revolutions to some extent. Thereby, when the speed change is performed from the infinite variable speed mode to the fixed gear ratio mode, it becomes possible to appropriately suppress the drivability deterioration caused due to change of the number of engine revolutions (e.g., increase of the number of engine revolutions).

In a manner, the control device for the hybrid vehicle may further include a speed change determination unit which predicts a future operation state and determines whether or not to execute the first speed change control based on the predicted operation state, wherein, only when the speed change determination unit determines to execute the first speed change control, the speed change control unit executes the first speed change control. Thereby, it becomes possible to suppress a useless change of the number of revolutions with the speed change in each revolution component and improve fuel consumption.

In another manner of the above control device for the hybrid vehicle, when an operation state does not become the operation state predicted by the speed change determination unit during executing the first speed change control, the speed change control unit may stop the execution of the first speed change control, and may execute a second speed change control that moves an operation point of the engine on a fuel consumption optimum line and an equipower line to change to the fixed gear ratio mode. Thereby, it becomes possible to suppress limp occurrence in such a case that the state does not become the predicted state. Namely, it becomes possible to prevent stagnation in a low efficiency operation area in the state of incomplete speed change.

Preferably, the speed change control unit may set the number of engine revolutions so that a difference between numbers of revolutions of engaging components used for switching the infinite variable speed mode and the fixed gear ratio mode becomes substantially 0, and may execute the first speed change control. Thereby, it becomes possible to shorten a revolution synchronization time of the engaging component at the time of changing the speed (a time of changing the speed, necessary to synchronize the engaging component with 0 revolution).

According to another aspect of the present invention, there is provided a control device for a hybrid vehicle which includes an engine and a motor generator as a driving source, and which switches at least two modes: an infinite variable speed mode; and a fixed gear ratio mode, including: a speed change control unit which executes a first speed change control that maintains a number of revolutions equal to or larger than a number of engine revolutions at a time of setting the fixed gear ratio mode, and increases an engine torque to change to the infinite variable speed mode, when the speed change is performed from the fixed gear ratio mode to the infinite variable speed mode.

When the speed change is performed from the fixed gear ratio mode to the infinite variable speed mode, the control device for the hybrid vehicle maintains the number of revolutions equal to or larger than the number of engine revolutions at the time of setting the fixed gear ratio mode, and increases the engine torque to execute the first speed change control for changing to the infinite variable speed mode. Thereby, when the speed change is performed from the fixed gear ratio mode to the infinite variable speed mode, it becomes possible to appropriately suppress the drivability deterioration caused due to the change of the number of engine revolutions (e.g., decrease of the number of engine revolutions). Also, it becomes possible to improve a driving force response characteristic (an acceleration performance).

In a manner, the control device for the hybrid vehicle may further include a speed change determination unit which predicts a future operation state and determines whether or not to execute the first speed change control based on the predicted operation state, wherein, only when the speed change determination unit determines to execute the first speed change control, the speed change control unit executes the first speed change control. Thereby, it becomes possible to suppress the useless change of the number of revolutions with changing the speed in each revolution component and improve the fuel consumption. Also, it becomes possible to improve the acceleration performance.

In another manner of the above control device for the hybrid vehicle, when an operation state does not become the operation state predicted by the speed change determination unit during the execution of the first speed change control, the speed change control unit may stop the execution of the first speed change control, and may execute a second speed change control that moves an operation point of the engine on a fuel consumption optimum line and an equipower line to change to the fixed gear ratio mode. Thereby, it becomes possible to prevent the stagnation in the low efficiency operation area in the state of incomplete speed change.

EFFECT OF THE INVENTION

The control device for the hybrid vehicle according to the present invention is mounted on the hybrid vehicle including the engine and the motor generator as the driving source and capable of switching at least two modes, i.e., the infinite variable speed mode and the fixed gear ratio mode.

When the speed gear is shifted from the infinite variable speed mode to the fixed gear ratio mode, the first speed change control to maintain the number of revolutions equal to or larger than the number of engine revolutions at the time of setting the infinite variable speed mode and reduce the engine torque to shift the speed gear in the fixed gear ratio mode is executed. Thereby, when the speed gear is shifted from the infinite variable speed mode to the fixed gear ratio mode, it becomes possible to appropriately suppress the drivability deterioration caused due to the change of the number of engine revolutions.

BEST MODE FOR CARRYING OUT THE INVENTION

A preferred embodiment of the present invention will be explained hereinafter with reference to the drawings.

[Device Configuration]

Figure 1:
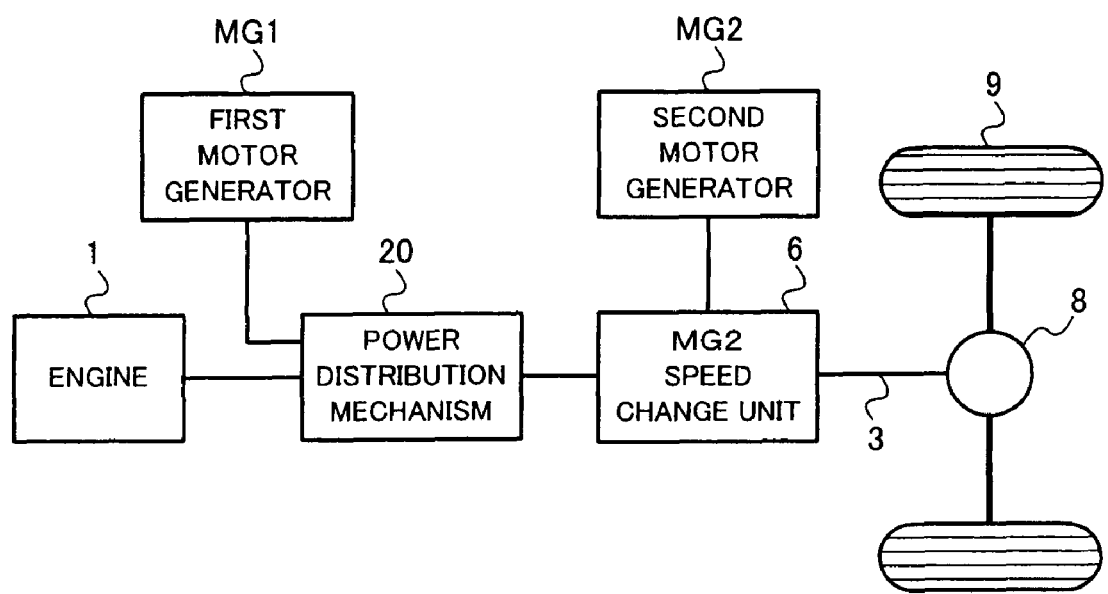
FIG. 1 shows a schematic configuration of a hybrid vehicle according to an embodiment.

FIG. 1 shows a schematic configuration of a hybrid vehicle to which the present invention is applied. An example of FIG. 1 is the hybrid vehicle referred to as a mechanical distribution double-motor type, including an engine (internal combustion engine) 1, a first motor generator MG1, a second motor generator MG2 and a power distribution mechanism 20. The engine 1 serving as a power source and the first motor generator MG1 serving as a revolution number control mechanism are connected to the power distribution mechanism 20. The second motor generator MG2 serving as a sub power source for assisting a driving torque or a braking force is connected to the output axis 3 of the power distribution mechanism 20. The second motor generator MG2 and the output axis 3 are connected via a MG2 speed change unit 6. Further, the output axis 3 is connected to right and left driving wheels 9 via a final decelerator 8. The first motor generator MG1 and the second motor generator MG2 are electrically connected to each other via a battery, an inverter or an appropriate controller (see FIG. 2) or directly, and they are formed so that the power generated in the first motor generator MG1 drives the second motor generator MG2.

The engine 1 is a heat engine which combusts fuel and generates the power, e.g., a gasoline engine and a diesel engine. Mainly, the first motor generator MG1 receives the torque from the engine 1, and revolves to generate the power. At this time, reaction power of the torque caused by the power generation operates on the first motor generator MG1. By controlling the number of revolutions of the first motor generator MG1, the number of revolutions of the engine 1 continuously changes. Such a speed change mode is referred to as the infinite variable speed mode. The infinite variable speed mode is realized by a differential operation of the power distribution mechanism 20, which will be described later.

The second motor generator MG2 is the device which assists the driving torque or the braking force. When assisting the driving torque, the second motor generator MG2 receives the power supply to function as an electromotor. Meanwhile, when assisting the braking force, the second motor generator MG2 is revolved by the torque transmitted from the driving wheels 9, and functions as a generator which generates the power.

Figure 2:
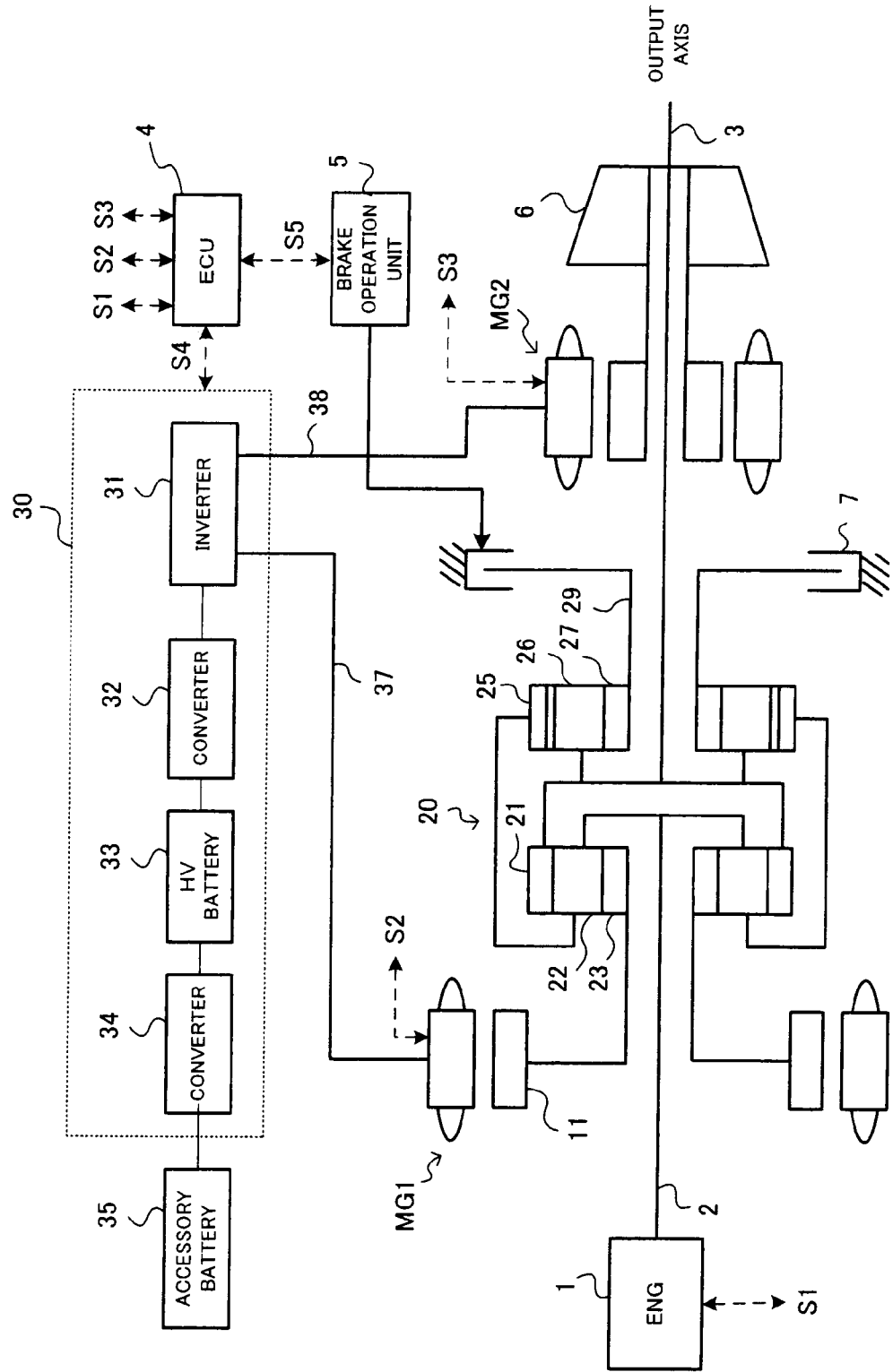
FIG. 2 shows a configuration of a motor generator and a power transmission mechanism.

FIG. 2 shows the configuration of the first and second motor generators MG1 and MG2 and the power distribution mechanism 20, shown in FIG. 1.

The power distribution mechanism 20 distributes the output torque of the engine 1 to the first motor generator MG1 and the output axis 3, and is formed so that the differential operation occurs. Concretely, the power distribution mechanism 20 has a plural pairs of differential mechanisms, and in four revolution components mutually generating the differential operation, the engine 1 is connected to the first revolution component, and the first motor generator MG1 is connected to the second revolution component. Also, the output axis 3 is connected to the third revolution component. The fourth revolution component is fixable by the brake unit 7. The brake unit 7 is formed by a dog clutch, and is controlled by the brake operation unit 5. In such a state that the brake unit 7 does not fix the fourth revolution component, the number of revolutions of the engine 1 continuously changes by continuously changing the number of revolutions of the first motor generator MG1, and the infinite variable speed mode is realized. Meanwhile, in such a state that the brake unit 7 fixes the fourth revolution component, the speed gear ratio determined by the power distribution mechanism 20 is fixed in an overdrive state (i.e., in such a state that the number of engine revolutions becomes smaller than the number of output revolutions), and the fixed gear ratio mode is realized.

In this embodiment, as shown in FIG. 2, the power distribution mechanism 20 is formed by combining two planetary gear mechanisms. The first planetary gear mechanism includes a ring gear 21, a carrier 22 and a sun gear 23. The second planetary gear mechanism, which is a double-pinion type, includes a ring gear 25, a carrier 26 and a sun gear 27.

The output axis 2 of the engine 1 is connected to the carrier 22 of the first planetary gear mechanism, and the carrier 22 is connected to the ring gear 25 of the second planetary gear mechanism. They form the first revolution component. A rotor 11 of the first motor generator MG1 is connected to the sun gear 23 of the first planetary gear mechanism. They form the second revolution component.

The ring gear 21 of the first planetary gear mechanism and the carrier 26 of the second planetary gear mechanism are connected to each other, and are also connected to the output axis 3. They form the third revolution component. Further, the sun gear 27 of the second planetary gear mechanism is connected to the revolution axis 29. They form the fourth revolution component with the revolution axis 29. The revolution axis 29 is fixable by the brake unit 7.

A power source unit 30 includes an inverter 31, a converter 32, an HV battery 33 and a converter 34. The first motor generator MG1 is connected to the inverter 31 by a power source line 37, and the second motor generator MG2 is connected to the inverter 31 by a power source line 38. In addition, the inverter 31 is connected to the converter 32, and the converter 32 is connected to the HV battery 33. Moreover, the HV battery 33 is connected to an accessory battery 35 via the converter 34.

The inverter 31 gives and receives the power to and from the motor generators MG1 and MG2. At the time of regenerating the motor generators, the inverter 31 converts, to the direct current, the power generated by the regeneration of the motor generators MG1 and MG2, and supplies it to the converter 32. The converter 32 converts the voltage of the power supplied from the inverter 31, and charges the HV battery 33. Meanwhile, at the time of powering the motor generators, the voltage of the direct current power outputted from the HV battery 33 is raised by the converter 32, and is supplied to the motor generator MG1 or MG2 via the power source line 37 or 38.

The voltage of the power of the HV battery 33 is converted by the converter 34, and is supplied to the accessory battery 35 to be used for driving various kinds of accessories.

The operations of the inverter 31, the converter 32, the HV battery 33 and the converter 34 are controlled by an ECU 4. The ECU 4 transmits a control signal S4, and controls the operation of each of the components in the power source unit 30. In addition, the signal necessary to show the state of each component in the power source unit 30 is supplied to the ECU 4 as the control signal S4. Concretely, a SOC (State Of Charge) showing the state of the HV battery 33 and an input/output limit value of the battery are supplied to the ECU 4 as the control signal S4.

The ECU 4 transmits and receives control signals S1 to S3 with the engine 1, the first motor generator MG1 and the second motor generator MG2, and controls them. In addition, the ECU 4 supplies a brake operation instruction signal S5 to the brake operation unit 5. The brake operation unit 5 operates the brake unit 7 based on the brake operation instruction signal S5, and controls engagement/release of the revolution axis 29 being the fourth revolution component. The ECU 4 corresponds to the control device for the hybrid vehicle in the present invention, and functions as a speed change control unit and a speed change determination unit, which will be described in details, later.

Figure 3:
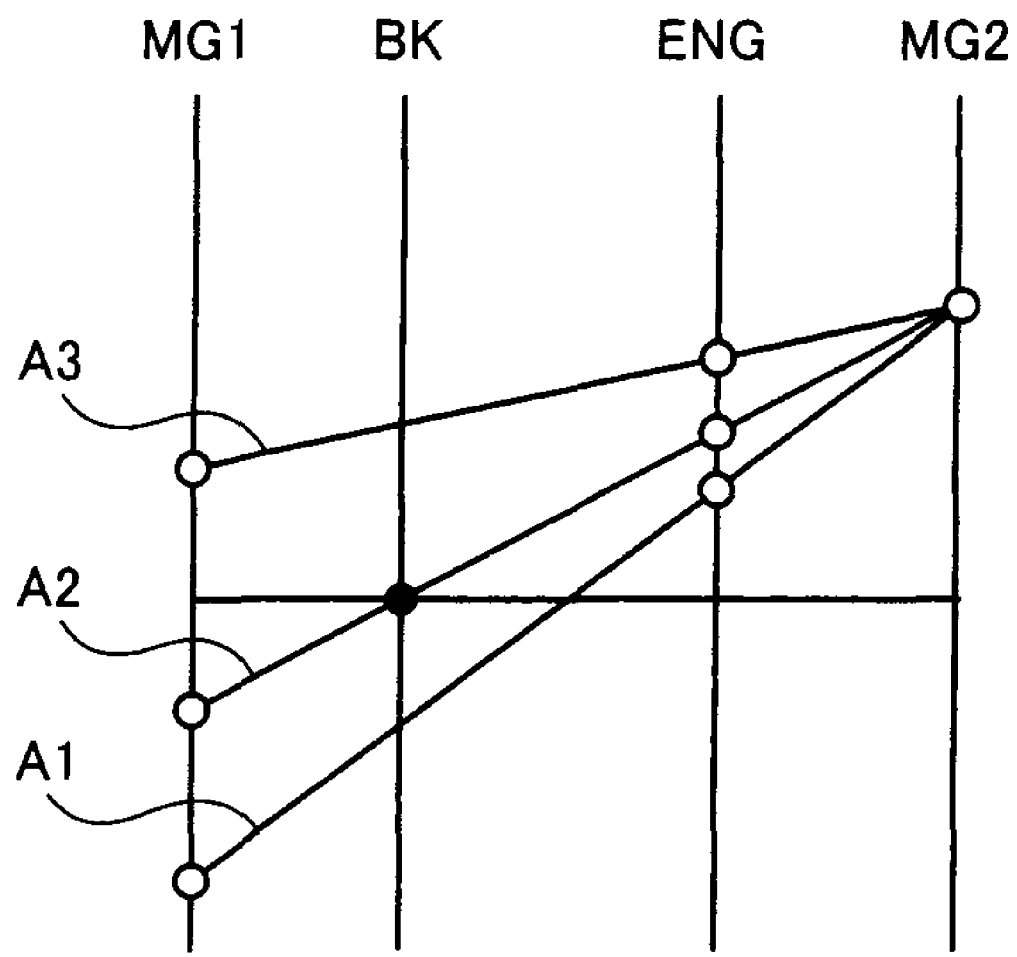
FIG. 3 shows an example of an alignment chart in an infinite variable speed mode and a fixed gear ratio mode.

FIG. 3 shows an example of an alignment chart in the infinite variable speed mode and the fixed gear ratio mode. Lines A1 and A3 show alignment charts in the infinite variable speed mode, and a line A2 shows an alignment chart in the fixed gear ratio mode. In the fixed gear ratio mode, the brake unit 7 is fixed as shown by a black dot in FIG. 3. In case of the speed change from the infinite variable speed mode to the fixed gear ratio mode, the state changes from the state shown by the line A1 to the state shown by the line A2, for example. Meanwhile, in case of the speed change from the fixed gear ratio mode to the infinite variable speed mode, the state changes from the state shown by the line A2 to the state shown by the line A1, for example.

[Speed Change Control]

Next, a description will be given of the speed change control according to the embodiment of the present invention. In this embodiment, the above-mentioned ECU 4 executes the speed change control when the speed change is executed between the infinite variable speed mode and the fixed gear ratio mode.

Figure 4:
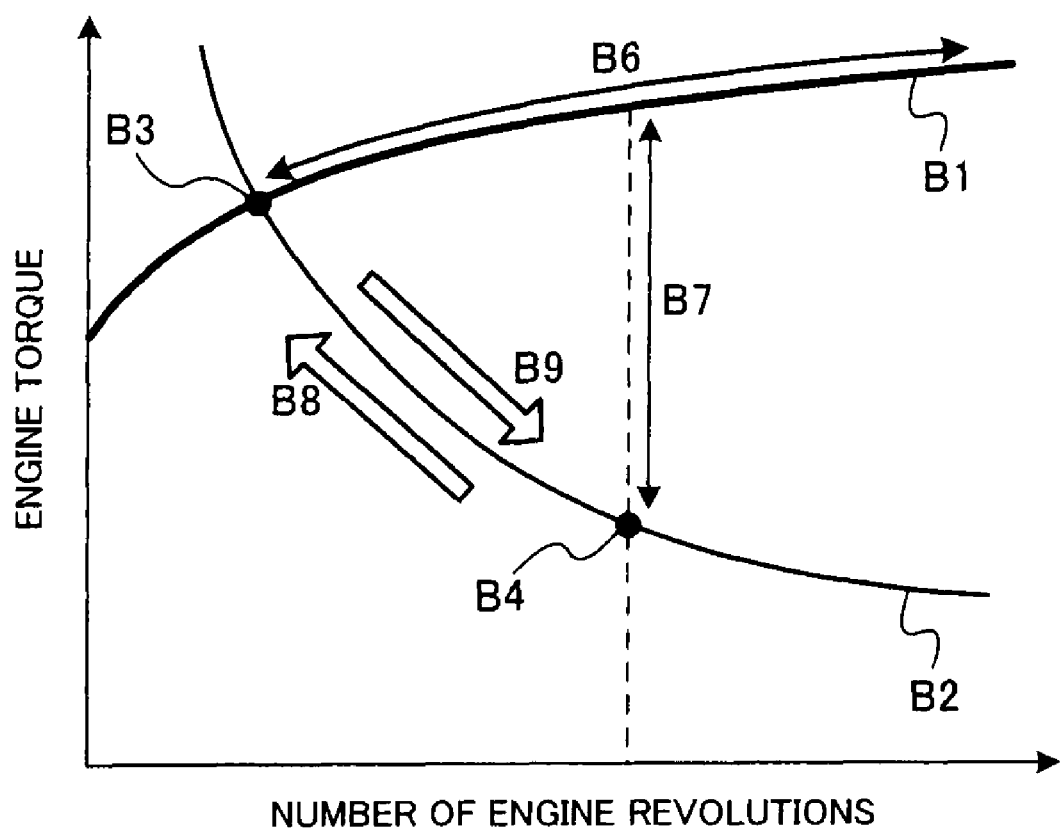
FIG. 4 shows a diagram for explaining a problem occurring at a time of shifting a speed gear.

Now, a description will be given of a problem which can occur at the time of performing the speed change between the infinite variable speed mode and the fixed gear ratio mode, with reference to FIG. 4. In FIG. 4, a horizontal axis shows the number of engine revolutions, and a vertical axis shows the engine torque.

A graph shown by a reference numeral B1 shows an engine operation line (fuel consumption optimum line) used in the infinite variable speed mode, and a graph shown by a reference numeral B2 shows an equipower line. The equipower line B2 is defined based on the engine operation line B1 in the infinite variable speed mode and an operation point (a point B4, which will be described later) used in the fixed gear ratio mode. Further, an operation point shown by a reference numeral B3 is used in the infinite variable speed mode, and an operation point shown by a reference numeral B4 is used in the fixed gear ratio mode. Namely, the side of low engine revolution and high torque is used in the infinite variable speed mode, and the side of high engine revolution and low torque is used in the fixed gear ratio mode. The reason will be described below.

In the infinite variable speed mode, the driving force up to the upper limit output can be generated by increasing the number of engine revolutions. Thus, a margin driving force comparably becomes large, as shown by an arrow B6 on the engine operation line B1. Meanwhile, in the fixed gear ratio mode, the number of engine revolutions is fixed at a constant ratio in correspondence with the vehicle speed, and the driving force only up to the upper limit torque at the number of engine revolutions can be generated. Thus, the margin driving force comparably becomes small, as shown by an arrow B7. Therefore, the margin driving force in the fixed gear ratio mode tends to be smaller than the margin driving force in the infinite variable speed mode. Meanwhile, though the margin driving force tends to be small in the fixed gear ratio mode in this manner, an electric path is small and transmission efficiency is high at the operation point B4, and thus, it can be said that the state at the operation point B4 is more advantageous than the state at the operation point B3, in consideration of the fuel consumption. Namely, it is advantageous to use the operation point B4 at the time of normal traveling at which the fuel consumption is considered more important. Meanwhile, it is advantageous to use the operation point B3 at the time of acceleration at which the driving force is considered more important.

As described above, since the margin driving force in the fixed gear ratio mode is smaller than the margin driving force in the infinite variable speed mode, it is necessary to shift from the fixed gear ratio mode to the infinite variable speed mode and accelerate at the time that the sudden large driving force is required. In this case, if the speed change is performed from the fixed gear ratio mode to the infinite variable speed mode as shown by an arrow B8, i.e., if the speed change is performed by moving the engine operation point on the equipower line B2, the vehicle movement becomes slow and deterioration of passing acceleration performance can happen due to the speed change. Further, since the operation point B3 is used in the infinite variable speed mode and the operation point B4 is used in the fixed gear ratio mode, the number of engine revolutions changes, and hence the drivability may deteriorate. Concretely, at the time of acceleration and speed change from the fixed gear ratio mode, if the speed change is performed as shown by the arrow B8, uncomfortable feeling may be caused due to decrease of the number of engine revolutions. In addition, at the time of deceleration and speed change from the infinite variable speed mode, if the speed change is performed as shown by an arrow B9, uncomfortable feeling may be caused due to the increase of the number of engine revolutions.

As described above, so as to suppress the problem occurring at the time of speed change, the speed change control to maintain the number of revolutions equal to or larger than the number of engine revolutions in the mode set at present (hereinafter referred to as "high revolution maintaining speed change control") is executed in the embodiment. Namely, the speed change is performed with maintaining the number of high revolutions to some extent without decreasing and increasing the number of engine revolutions. Concretely, when the speed change is performed from the infinite variable speed mode to the fixed gear ratio mode, the ECU4 executes the high revolution maintaining speed change control to maintain the number of revolutions equal to or larger than the number of engine revolutions at the time of setting the infinite variable speed mode and decrease the engine torque. Meanwhile, when the speed change is performed from the fixed gear ratio mode to the infinite variable speed mode, the ECU 4 executes the high revolution maintaining speed change control to maintain the number of revolutions equal to or larger than the number of engine revolutions at the time of setting the fixed gear ratio mode and increase the engine torque. By executing the high revolution maintaining speed change control, it becomes possible to appropriately suppress the occurrence of uncomfortable feeling (drivability deterioration) caused due to the change of the number of engine revolutions.

Hereinafter, the speed change control to by moving the engine operation point on the engine operation line (fuel consumption optimum line) B1 and the equipower line B2 is referred to as "normal speed change control" in contrast to the above high revolution maintaining speed change control. Additionally, the high revolution maintaining speed change control corresponds to the first speed change control, and the normal speed change control corresponds to the second speed change control.

Now, a concrete description will be given of embodiments of the speed change control executed by the ECU 4.

First Embodiment

First, a description will be given of the speed change control according to a first embodiment. The speed change control according to the first embodiment corresponds to the control executed at the time of the speed change from the infinite variable speed mode to the fixed gear ratio mode. The speed change control according to the first embodiment is executed by the above-mentioned ECU 4.

Figure 5:
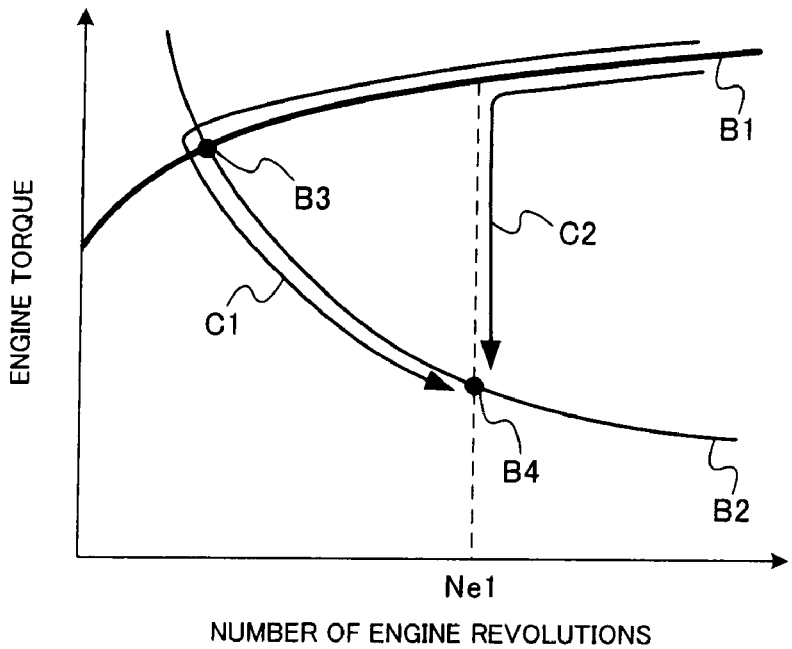
FIG. 5 shows a diagram for explaining speed change control according to a first embodiment.

FIG. 5 is a diagram for explaining the speed change control according to the first embodiment. In FIG. 5, the horizontal axis shows the number of engine revolutions, and the vertical axis shows the engine torque. An arrow C1 shows a course of the operation point in the case of executing the normal speed change control, and an arrow C2 shows a course of the operation point in the case of executing the high revolution maintaining speed change control. It is prescribed that the same reference numerals as those shown in FIG. 4 have the same meanings, and explanations thereof are omitted.

In the first embodiment, when the speed change is performed from the infinite variable speed mode to the fixed gear ratio mode, the ECU 4 basically executes the high revolution maintaining speed change control to maintain the number of revolutions equal to or larger than the number of engine revolutions at the time of setting the infinite variable speed mode and decrease the engine torque. In details, the ECU 4 determines whether or not to execute the high revolution maintaining speed change control with using a predetermined condition. When the predetermined condition is satisfied, the ECU 4 executes the high revolution maintaining speed change control. Meanwhile, when the predetermined condition is not satisfied, the ECU 4 executes the normal speed change control (a detailed description will be given, later).

Concretely, as shown by the arrow C2 in FIG. 5, in the high revolution maintaining speed change control, the engine torque is decreased in such a state that the number of engine revolutions is maintained approximately at Ne1, and the engine operation point is moved in the direction of the operation point B4. Thereby, the speed change is performed from the infinite variable speed mode to the fixed gear ratio mode. In this case, the ECU 4 executes the high revolution maintaining speed change control by mainly executing a control to decrease a throttle opening degree. In addition, the ECU 4 sets the number of engine revolutions at the time of maintaining the high revolution so that the difference between the numbers of revolutions of the engaging components in the brake unit 7 becomes approximately 0. Then, the ECU 4 executes the high revolution maintaining speed change control.

Thereby, it becomes possible to shorten a revolution synchronization time (the speed change time for synchronizing the brake unit 7 with 0 revolution) of the brake unit 7 at the time of the speed change.

On the other hand, as shown by the arrow C1 in FIG. 5, in the normal speed change control, the engine operation point is moved in the direction of the operation point B4 via the engine operation line B1 and the equipower line B2. Thereby, the speed change is performed from the infinite variable speed mode to the fixed gear ratio mode. In this case, the ECU 4 synchronizes the phase with the engaging component in the brake unit 7 by the first motor generator MG1, and changes the engine operation point on the equipower line B2 to engage the brake unit 7. The ECU 4 decreases the torque of the first motor generator MG1. Then, the ECU 4 executes the control in order to support the engine reaction force by the brake unit 7.

By executing the above-mentioned speed change control, it becomes possible to appropriately suppress the drivability deterioration caused due to the change of the number of engine revolutions (e.g., increase of the number of engine revolutions) at the time of the speed change from the infinite variable speed mode to the fixed gear ratio mode.

Next, a description will be given of a method of determining whether or not to execute the high revolution maintaining speed change control. In the first embodiment, the ECU 4 determines whether to execute the high revolution maintaining speed change control or the normal speed change control with using a predetermined condition. Concretely, the ECU 4 predicts the future operation state, and executes the determination based on the predicted operation state. Thereby, the ECU 4 executes the high revolution maintaining speed change control or the normal speed change control.

More concretely speaking, the ECU4 predicts the requested torque from the accelerator opening degree and the speed change information of the vehicle speed, and executes the above determination. Specifically, first, the ECU 4 calculates a time change amount (differential value) corresponding to the torque request calculated from the number of revolutions of the output axis 3 and the accelerator opening degree, and predicts the torque and the number of revolutions after a predetermined time Δt passes. The predetermined time Δt is set in advance in correspondence with the speed change time. Afterward, the ECU 4 determines whether or not to execute the high revolution maintaining speed change control based on a point (hereinafter referred to as "predicted request point") defined by the predicted torque and the number of revolutions. Concretely, the ECU 4 determines whether or not the predicted request point is positioned at an area to use the fixed gear ratio mode (hereinafter referred to as "fixed gear ratio area") and whether or not the torque corresponding to the predicted request point is smaller than the torque determined by a reference line. The reference line is calculated from the power corresponding to the above-mentioned equipower line B2 (see FIG. 5). In this case, the ECU 4 determines to execute the high revolution maintaining speed change control when the predicted request point is positioned in the fixed speed gear area and the torque corresponding to the predicted request point is smaller than the torque determined by the reference line.

Figure 6:
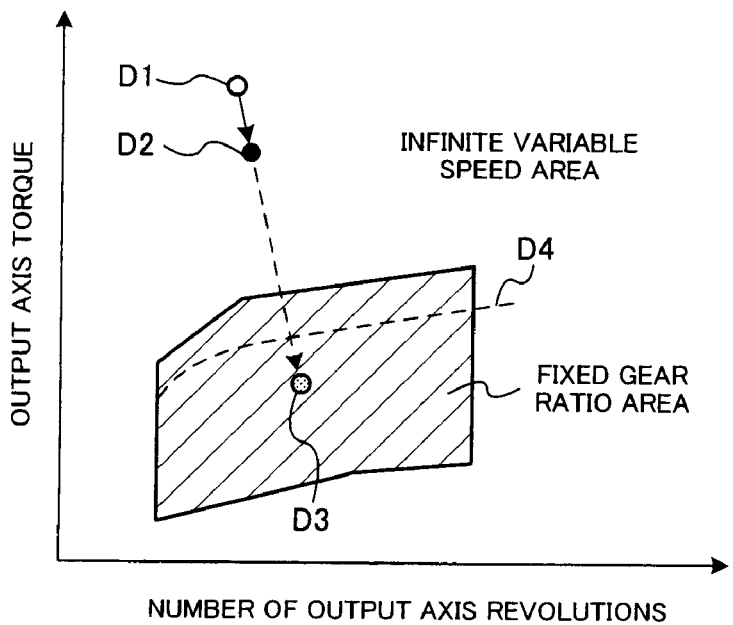
FIG. 6 shows a diagram for explaining a method of determining whether or not to execute high revolution maintaining speed change control in the first embodiment.

A concrete description will be given of the method of determining whether or not to execute the high revolution maintaining speed change control, with reference to FIG. 6. In FIG. 6, the horizontal axis shows the number of revolutions of the output axis 3 (the number of output axis revolutions), and the vertical axis shows the torque of the output axis 3 (output axis torque). In addition, in the area shown in FIG. 6, a hatching area corresponds to the fixed gear ratio area, and an area other than the hatching area corresponds to the area to use the infinite variable speed mode (hereinafter referred to as "infinite variable speed area"). Further, a broken line D4 corresponds to the above-mentioned reference line. The broken line D4 is calculated from the power corresponding to the above-mentioned equipower line B2 (see FIG. 5), and is provided at the position away from the border between the infinitely variable speed area and the fixed gear ratio area to some extent.

Here, it is prescribed that the point defined by the number of revolutions and the torque of the output axis 3 moves from a point shown by a reference numeral D1 to a point shown by a reference numeral D2. The ECU 4 calculates the time change amount corresponding to the torque request calculated by the number of revolutions of the output axis 3 and the accelerator opening degree, and seeks the predicted request point after the predetermined time Δt passes. In this case, a predicted request point D3 is obtained from the points shown by the numeral references D1 and D2. Based on the predicted request point D3, the ECU 4 determines whether or not to execute the high revolution maintaining speed change control. In this case, the predicted request point D3 is positioned in the fixed gear ratio area, and the torque corresponding to the predicted request point D3 is positioned below the reference line D4. Thus, the ECU 4 determines to execute the high revolution maintaining speed change control.

As described above, the ECU 4 determines whether or not to execute the high revolution maintaining speed change control, and executes the speed change control. Thereby, it becomes possible to suppress the unnecessary change of the number of revolutions of each revolution component at the time of the speed change, and it also becomes possible to improve the fuel consumption.

Next, a description will be given of the control in such a case that the operation state does not become the operation state predicted at the time of determining whether or not to execute the high revolution maintaining speed change control due to the change of the operation situation during executing the high revolution maintaining speed change control (hereinafter, this case is referred to as "high revolution maintenance failure"). In the first embodiment, when the high revolution maintenance failure occurs, the ECU 4 stops the high revolution maintaining speed change control, and executes the normal speed change control. Namely, the ECU 4 permits the increase of the number of engine revolutions, and changes the control from the high revolution maintaining speed change control to the normal speed change control. Concretely, when detecting that the request is larger than the reference line D4 and that the request is out of the fixed gear ratio area, the ECU 4 determines that the high revolution maintenance failure occurs. In this manner, by changing to the normal speed change control at the time of the high revolution maintenance failure, it becomes possible to suppress the occurrence of the limp in such a case that the state does not become the predicted state. Namely, it becomes possible to prevent the stagnation to the low efficiency operation area in the speed change uncompleted state.

Figure 7:
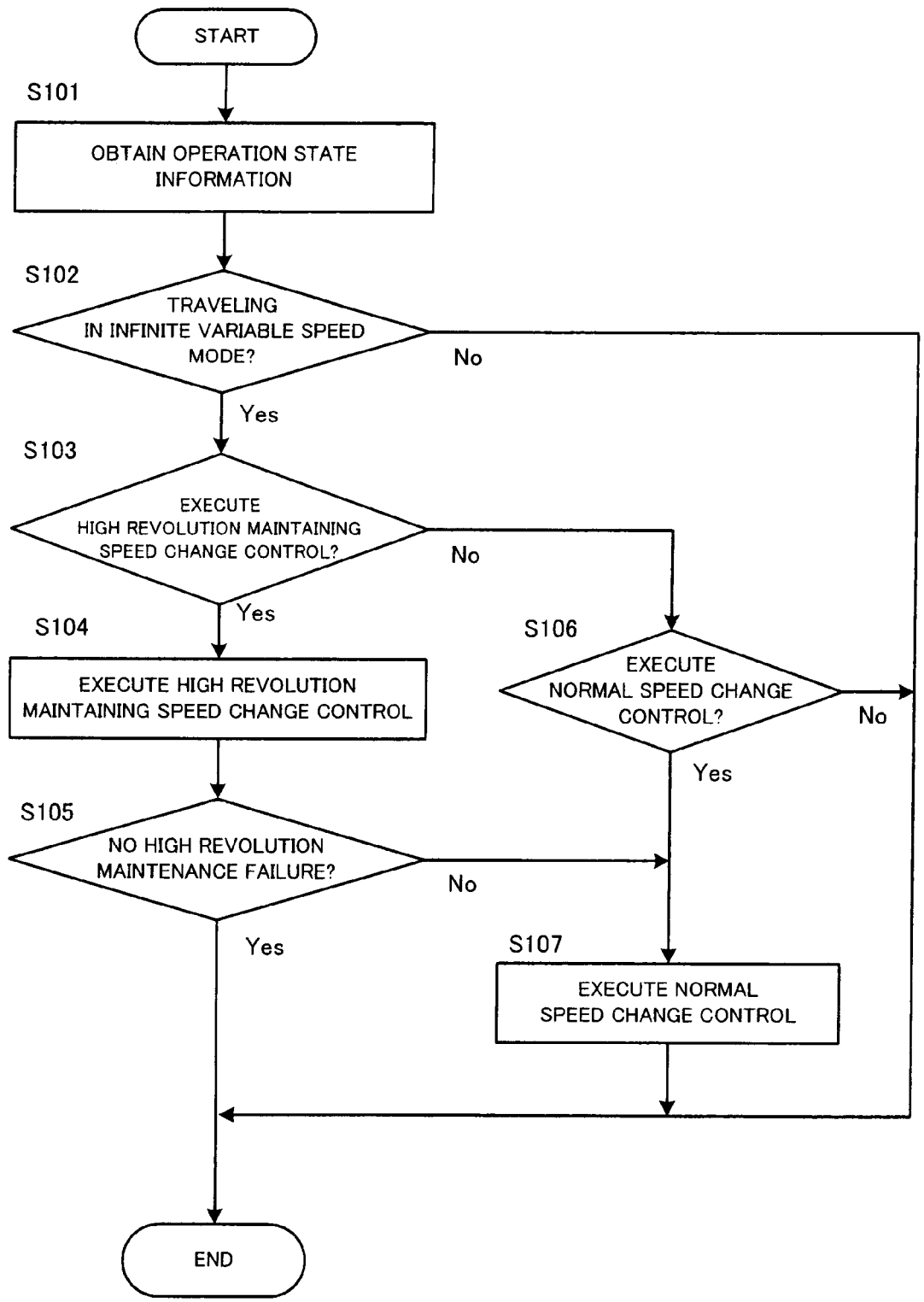
FIG. 7 is a flow chart showing a speed change control process according to the first embodiment.

Next, a description will be given of a speed change control process according to the first embodiment, with reference to FIG. 7. FIG. 7 is a flowchart showing the speed change control process according to the first embodiment. The speed change control process is basically executed when the speed change is performed from the infinite variable speed mode to the fixed gear ratio mode. For example, the speed change control process is executed at the time of the speed reduction change from the infinite variable speed mode to the fixed gear ratio mode. In addition, this process is repeatedly executed by the ECU 4.

First, in step S101, the ECU 4 obtains the operation state information. Concretely, the ECU 4 obtains the number of revolutions of each component, the states of the engaging components, e.g., the torque, the brake unit 7 and the clutch, the operation of the accelerator, the brake and the shift by the driver, and the states of the battery, the motor generators MG1 and MG2 and the inverter 31, as the operation state information. Then, the process goes to step S102.

In step S102, the ECU 4 determines whether or not the vehicle is traveling in the infinite variable speed mode. Concretely, the ECU 4 determines whether or not the vehicle is traveling in the infinite variable speed mode, based on the operation state information obtained in step S101. For example, the ECU 4 executes the determination based on the relation of the number of revolutions shown in FIG. 3. When the vehicle is traveling in the infinite variable speed mode (step S102; Yes), the process goes to step S103. Meanwhile, when the vehicle is not traveling in the infinite variable speed mode (step S102; No), i.e., when the vehicle is traveling in the fixed gear ratio area, the process goes out of the flow.

In step S103, the ECU4 determines whether or not to execute the high revolution maintaining speed change control. Concretely, the ECU 4 predicts the future operation state, and determines whether to execute the high revolution maintaining speed change control or the normal speed change control, based on the predicted operation state. For example, the ECU 4 calculates the time change amount corresponding to the torque request calculated from the number of revolutions of the output axis 3 and the accelerator opening degree, and seeks the predicted request point after the predetermined time Δt passes. Then, the ECU 4 determines whether or not the predicted request point is positioned in the fixed gear ratio area and whether or not the torque corresponding to the predicted request point is smaller than the torque determined by the reference line D4. In this case, when the predicted request point is positioned in the fixed gear ratio area and the torque corresponding to the predicted request point is smaller than the torque determined by the reference line D4, the ECU 4 determines to execute the high revolution maintaining speed change control. When the high revolution maintaining speed change control is executed (step S103; Yes), the process goes to step S104. Meanwhile, when the high revolution maintaining speed change control is not executed (step S103; No), the process goes to step S106.

In step S104, the ECU 4 executes the high revolution maintaining speed change control. Concretely, the ECU 4 maintains the number of revolutions equal to or larger than the number of engine revolutions at the time of setting the infinite variable speed mode, and executes the high revolution maintaining speed change control to reduce the engine torque. In this case, the ECU4 executes the high revolution maintaining speed change control by mainly executing the control to reduce the throttle opening degree. In addition, the ECU 4 sets the number of engine revolutions at the time of maintaining the high revolution so that the difference between the numbers of revolutions of the engaging components in the brake unit 7 becomes approximately 0. Then, the ECU 4 executes the high revolution maintaining speed change control. Afterward, the process goes to step S105.

In step S105, the ECU 4 determines whether or not the high revolution maintenance failure occurs. Namely, the ECU 4 determines whether or not the operation state is out of the operation state predicted in step S103 during executing the high revolution maintaining speed change control. For example, when detecting that the request is larger than the reference line D4 and/or out of the fixed gear ratio area, the ECU 4 determines that the high revolution maintenance failure occurs. When the high revolution maintenance failure does not occur (step S105; Yes), the process goes out of the flow. In this case, the ECU 4 performs the speed change from the infinite variable speed mode to the fixed gear ratio mode by continuously executing the high revolution maintaining speed change control. Meanwhile, when the high revolution maintenance failure occurs (step S105; No), the process goes to step S107. In step S107, the ECU 4 executes the normal speed change control. Namely, the ECU 4 changes the control from the high revolution maintaining speed change control to the normal speed change control. Then, the process goes out of the flow.

Meanwhile, in step S106, the ECU 4 determines whether or not to execute the normal speed change control. Concretely, the ECU 4 executes the determination in correspondence with the driver request torque, the vehicle speed and the state of the battery, based on the information obtained in step S101. For example, the ECU 4 executes the determination based on the area shown in FIG. 6. When the normal speed change control is executed (step S106; Yes), the process goes to step S107. In this case, the ECU 4 executes the normal speed change control (step S107). Concretely, the ECU 4 synchronizes the phase with the engaging component in the brake unit 7 by the first motor generator MG1, and changes the engine operation point on the equipower line B2 to engage the brake unit 7. Then, the ECU 4 reduces the torque of the first motor generator MG1, and executes the control so that the engine reaction force is supported by the brake unit 7. Then, the process goes out of the flow. Meanwhile, when the normal speed change control is not executed (step S106; No), the process goes out of the flow.

By the speed change control process according to the above-mentioned first embodiment, it becomes possible to appropriately suppress the drivability deterioration caused due to the change of the number of engine revolutions (e.g., the increase of the number of engine revolutions) when the speed change is performed from the infinite variable speed mode to the fixed gear ratio mode. It also becomes possible to reduce the energy loss due to the change of the number of revolutions of each revolution component and improve the fuel consumption.

Second Embodiment

Next, a description will be given of the speed change control according to a second embodiment. The speed change control according to the first embodiment is the control executed at the time of performing the speed change from the infinite variable speed mode to the fixed gear ratio mode. Meanwhile, the speed change control according to the second embodiment is the control executed at the time of performing the speed change from the fixed gear ratio mode to the infinite variable speed mode. The speed change control according to the second embodiment is also executed by the ECU 4.

Figure 8:
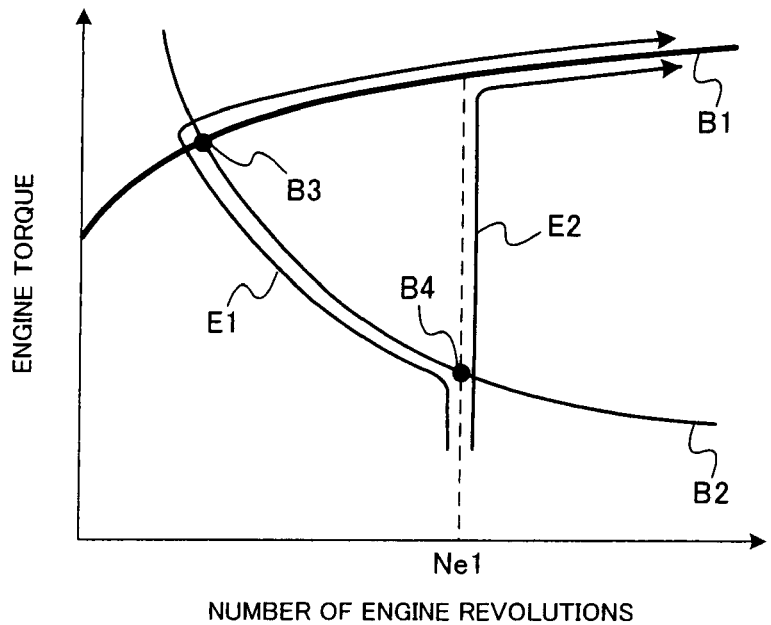
FIG. 8 shows a diagram for explaining speed change control according to a second embodiment.

FIG. 8 is a diagram for explaining the speed change control according to the second embodiment. In FIG. 8, the horizontal axis shows the number of engine revolutions, and the vertical axis shows the engine torque. An arrow E1 shows the course of the operation point in such a case that the normal speed change control is executed, and an arrow E2 shows the course of the operation point in such a case that the high revolution maintaining speed change control is executed. In FIG. 8, the same reference numerals as those in FIG. 4 and FIG. 5 have the same meanings as those in FIG. 4 and FIG. 5, and the explanation thereof will be omitted.

In the second embodiment, when the speed change is performed from the fixed gear ratio mode to the infinite variable speed mode, the ECU 4 basically executes the high revolution maintaining speed change control which maintains the number of revolutions equal to or larger than the number of engine revolutions at the time of setting the fixed gear ratio mode and increases the engine torque. Specifically, as described above, the ECU 4 executes the determination based on the predicted operation state, and executes the high revolution maintaining speed change control or the normal speed change control.

Concretely, as shown by the arrow E2 in FIG. 8, in the high revolution maintaining speed change control, the engine torque is increased with maintaining the number of engine revolutions at the number of revolutions Ne1, and the speed change is performed from the fixed gear ratio mode to the infinite variable speed mode. In this case, the ECU 4 makes the first motor generator MG1 output the torque of the amount corresponding to the engine reaction force, and reduces a support torque in the brake unit 7 to release the brake unit 7. At the same time, the ECU 4 executes the control to open the throttle opening degree, and executes the high revolution maintaining speed change control. Meanwhile, as shown by the arrow E1, in the normal speed change control, the ECU 4 changes the engine operation point to the direction of the operation point B3 via the engine operation line B1 and the equipower line B2, and performs the speed change from the fixed gear ratio mode to the infinite variable speed mode. In this case, the ECU 4 makes the first motor generator MG1 output the torque of the amount corresponding to the engine reaction force, and reduces the support torque in the brake unit 7 to release the brake unit 7. Then, the ECU 4 executes the control to move the engine operation point to the operation point B3 on the equipower line B2.

By executing the above-mentioned speed change control, when the speed change is performed from the fixed gear ratio mode to the infinite variable speed mode, it becomes possible to appropriately suppress the drivability deterioration caused due to the change of the number of engine revolutions (e.g., the decrease of the number of engine revolutions).

Next, a description will be given of a method of determining whether or not to execute the high revolution maintaining speed change control. In the second embodiment, based on the predicted operation state, the ECU 4 determines whether to execute the high revolution maintaining speed change control or the normal speed change control in the approximately same method as that of the first embodiment, too. Concretely, the ECU 4 calculates the time change amount corresponding to the torque request calculated from the number of revolutions of the output axis 3 and the accelerator opening degree, and obtains the predicted request point after the predetermined time Δt passes. Then, the ECU 4 determines whether or not the predicted request point is positioned in the infinite variable speed area and whether or not the torque corresponding to the predicted request point is larger than the torque determined by the reference line. In this case, the ECU 4 determines to execute the high revolution maintaining speed change control when the predicted request point is positioned in the infinite variable speed area and the torque corresponding to the predicted request point is larger than the torque determined by the reference line.

Figure 9:
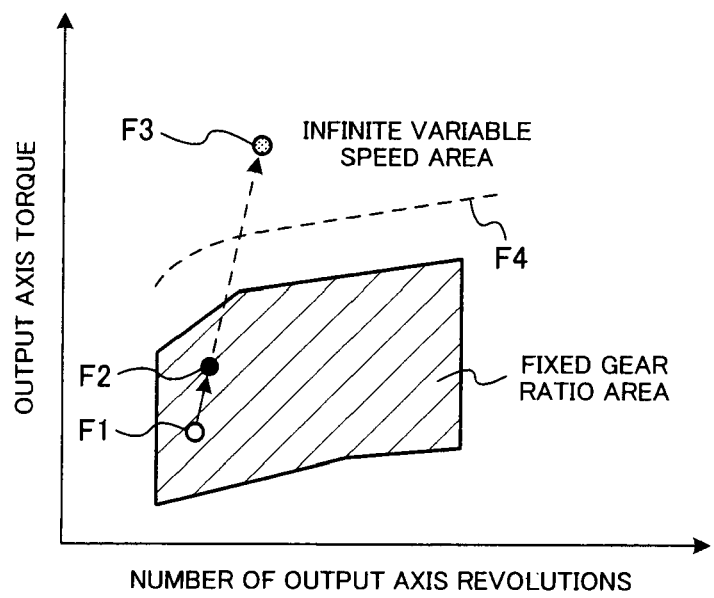
FIG. 9 shows a diagram for explaining a method of determining whether or not to execute high revolution maintaining speed change control in the second embodiment.

A concrete description will be given of a method of determining whether or not to execute the high revolution maintaining speed change control with reference to FIG. 9. In FIG. 9, the horizontal axis shows the number of output axis revolutions, and the vertical axis shows the output axis torque. In addition, in the area shown in FIG. 9, a hatching area corresponds to the fixed gear ratio area, and an area other than the hatching area corresponds to the infinite variable speed area. Further, a broken line F4 corresponds to the reference line. The reference line F4 is calculated from the power corresponding to the above-mentioned equipower line B2 (see FIG. 8), and is provided at the position away from the border between the infinite variable speed area and the fixed gear ratio area to some extent.

It is assumed that the point defined by the number of revolutions and the torque of the output axis 3 moves to a point shown by a reference numeral F2 from a point shown by a reference numeral F1. The ECU 4 seeks the predicted request point after the predetermined time Δt passes by calculating the time change amount corresponding to the torque request calculated from the number of revolutions of the output axis 3 and the accelerator opening degree. In this case, a predicted request point F3 is obtained from the points shown by the reference numerals F1 and F2. Based on the predicted request point F3, the ECU 4 determines whether or not to execute the high revolution maintaining speed change control. In this case, the predicted request point F3 is positioned in the infinite variable speed area, and the torque corresponding to the predicted request point F3 is positioned above the reference line F4. Therefore, the ECU 4 determines to execute the high revolution maintaining speed change control.

As described above, the ECU 4 determines whether or not to execute the high revolution maintaining speed change control, and executes the speed change control. Thereby, it becomes possible to suppress the unnecessary change of the number of revolutions with the speed change in each revolution component and improve the fuel consumption. Also, it becomes possible to improve a driving force response characteristic (acceleration performance).

Next, a description will be given of a control executed at the time of occurrence of the high revolution maintenance failure. In the second embodiment, when the high revolution maintenance failure occurs due to the change of the operation situation, the ECU 4 stops the high revolution maintaining speed change control, and executes the normal speed change control, too. Namely, the ECU 4 permits the decrease of the number of engine revolutions, and changes the control from the high revolution maintaining speed change control to the normal speed change control. Concretely, when detecting that the request is below the reference line F4, the ECU 4 determines that the high revolution maintenance failure occurs. In this manner, by changing the control to the normal speed change control at the time of the high revolution maintenance failure, it becomes possible to suppress the limp occurrence in such a case that the state does not become the predicted state. Namely, it becomes possible to prevent the stagnation in the low efficiency operation area in the speed change incomplete state.

Figure 10:
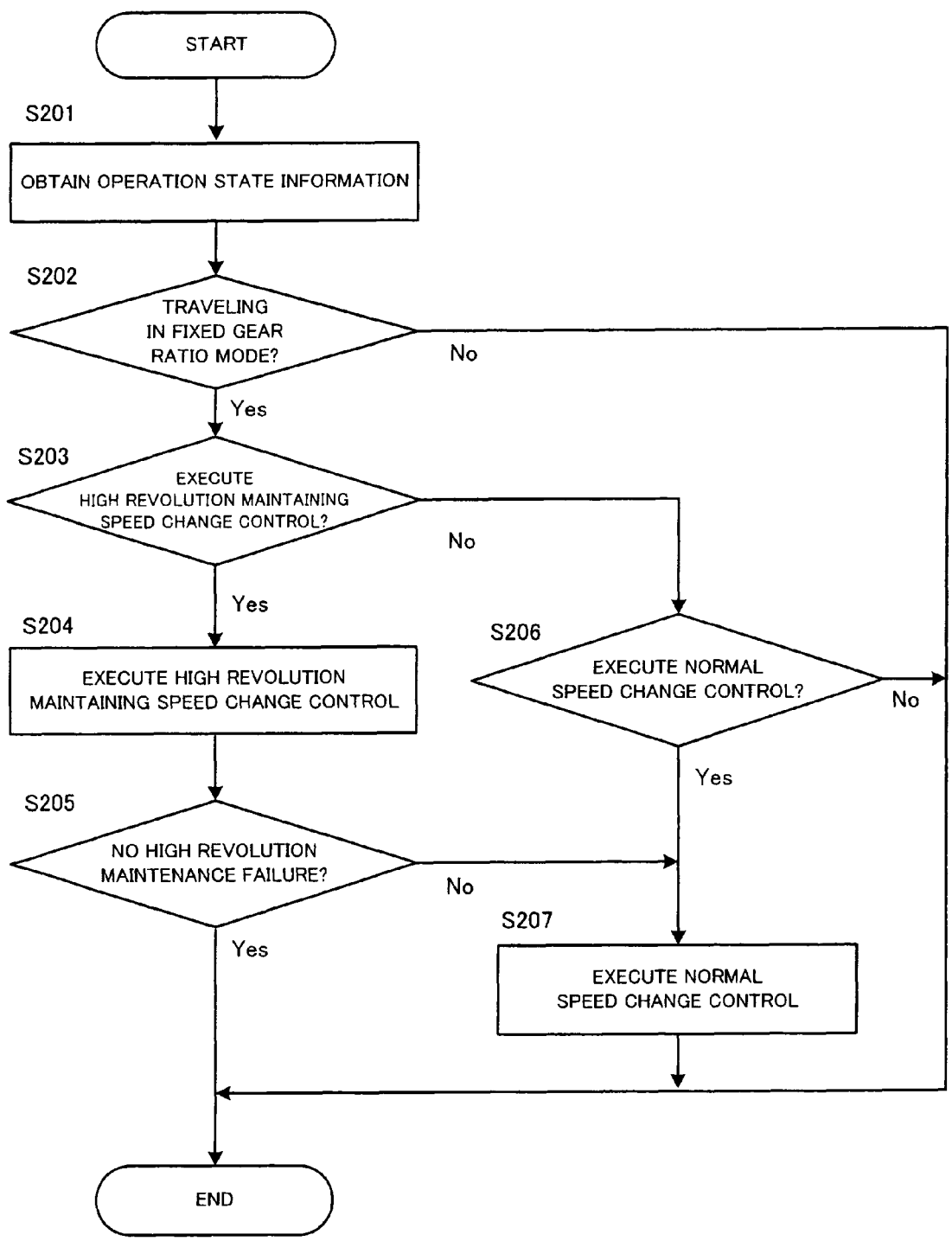
FIG. 10 is a flow chart showing a speed change control process according to the second embodiment.

Next, a description will be given of the speed change control process according to the second embodiment with reference to FIG. 10. FIG. 10 is a flow chart showing the speed change control process according to the second embodiment. Basically, the speed change control process is executed when the speed change is performed from the fixed gear ratio mode to the infinite variable speed mode. For example, the speed change control process is executed at the time of the acceleration speed change from the fixed gear ratio mode to the infinite variable speed mode. In addition, this process is repeatedly executed by the ECU 4.

First, in step S201, the ECU 4 obtains the operation state information. Concretely, the ECU 4 obtains the number of revolutions of each revolution component, the torque, the states of the engaging components such as the brake unit 7 and the clutch, the operation of the accelerator, brake and shift by the driver, and the states of the battery, the motor generators MG1 and MG2 and the inverter 31, as the operation state information. Then, the process goes to step S202.

In step S202, the ECU 4 determines whether or not the vehicle is traveling in the fixed gear ratio mode. Concretely, the ECU 4 determines whether or not the vehicle is traveling in the fixed gear ratio mode, based on the operation state information obtained in step S201. For example, the ECU 4 executes the determination based on the relation of the number of revolutions shown in FIG. 3. When the vehicle is traveling in the fixed gear ratio mode (step S202; Yes), the process goes to step S203. Meanwhile, when the vehicle is not traveling in the fixed gear ratio mode (step S202; No), i.e., when the vehicle is traveling in the infinite variable speed mode, the process goes out of the flow.

In step S203, the ECU4 determines whether or not to execute the high revolution maintaining speed change control. Concretely, the ECU 4 predicts the future operation state, and determines whether to execute the high revolution maintaining speed change control or the normal speed change control, based on the predicted operation state. For example, the ECU 4 calculates the time change amount corresponding to the torque request calculated from the number of revolutions of the output axis 3 and the accelerator opening degree, and seeks the predicted request point after the predetermined time Δt passes. Then, the ECU 4 determines whether or not the predicted request point is positioned in the infinite variable speed area and whether or not the torque corresponding to the predicted request point is larger than the torque determined by the reference line F4. In this case, when the predicted request point is positioned in the infinite variable speed area and the torque corresponding to the predicted request point is larger than the torque determined by the reference line F4, the ECU 4 determines to execute the high revolution maintaining speed change control. When the ECU 4 executes the high revolution maintaining speed change control (step S203; Yes), the process goes to step S204. Meanwhile, when the ECU 4 does not execute the high revolution maintaining speed change control (step S203; No), the process goes to step S206.

In step S204, the ECU 4 executes the high revolution maintaining speed change control. Concretely, the ECU 4 maintains the number of revolutions equal to or larger than the number of engine revolutions at the time of setting the fixed gear ratio mode, and executes the high revolution maintaining speed change control to increase the engine torque. In this case, the ECU 4 makes the first motor generator MG1 output the torque of the amount corresponding to engine reaction force, and reduces the support torque in the brake unit 7 to release the brake unit 7. At the same time, the ECU 4 executes the control to increase the throttle opening degree, and executes the high revolution maintaining speed change control. Then, the process goes to step S205.

In step S205, the ECU 4 determines whether or not the high revolution maintenance failure occurs. Namely, the ECU 4 determines whether or not the operation state is out of the operation state predicted in step S203 during executing the high revolution maintaining speed change control. For example, when detecting that the request is below the reference line F4, the ECU 4 determines that the high revolution maintenance failure occurs. When the high revolution maintenance failure does not occur (step S205; Yes), the process goes out of the flow. In this case, by continuously executing the high revolution maintaining speed change control, the speed change is performed from the fixed gear ratio mode to the infinite variable speed mode. Meanwhile, when the high revolution maintenance failure occurs (step S205; No), the process goes to step S207. In step S207, the ECU 4 executes the normal speed change control. Namely, the ECU 4 changes the control from the high revolution maintaining speed change control to the normal speed change control. Then, the process goes out of the flow.

Meanwhile, in step S206, the ECU 4 determines whether or not to execute the normal speed change control. Concretely, the ECU 4 executes the determination in correspondence with the states of the driver request torque, the vehicle speed and the battery state, based on the information obtained in step S201. For example, the ECU 4 executes the determination based on the area shown in FIG. 9. When the ECU 4 executes the normal speed change control (step S206; Yes), the process goes to step S207. In this case, the ECU executes the normal speed change control (step S207). Concretely, the ECU 4 makes the first motor generator MG1 output the torque of the amount corresponding to the engine reaction force, and reduces the support torque in the brake unit 7 to release the brake unit 7. Further, the ECU 4 executes the control so that the engine operation point moves to the operation point B3 on the equipower line B2. Then, the process goes out of the flow. Meanwhile, when the ECU 4 does not execute the normal speed change control (step S206; No), the process goes out of the flow.

By the speed change control process according to the second embodiment, when the speed change is performed from the fixed gear ratio mode to the infinite variable speed mode, it becomes possible to appropriately suppress the drivability deterioration caused due to the change of the number of engine revolutions (e.g., the reduction of the number of engine revolutions). It also becomes possible to reduce the energy loss in correspondence with the change of the number of revolutions of each revolution component and improve the fuel consumption. Further, it becomes possible to improve the driving force response characteristic (i.e., it becomes possible to improve the acceleration performance).

Another Embodiment

Figure 11:
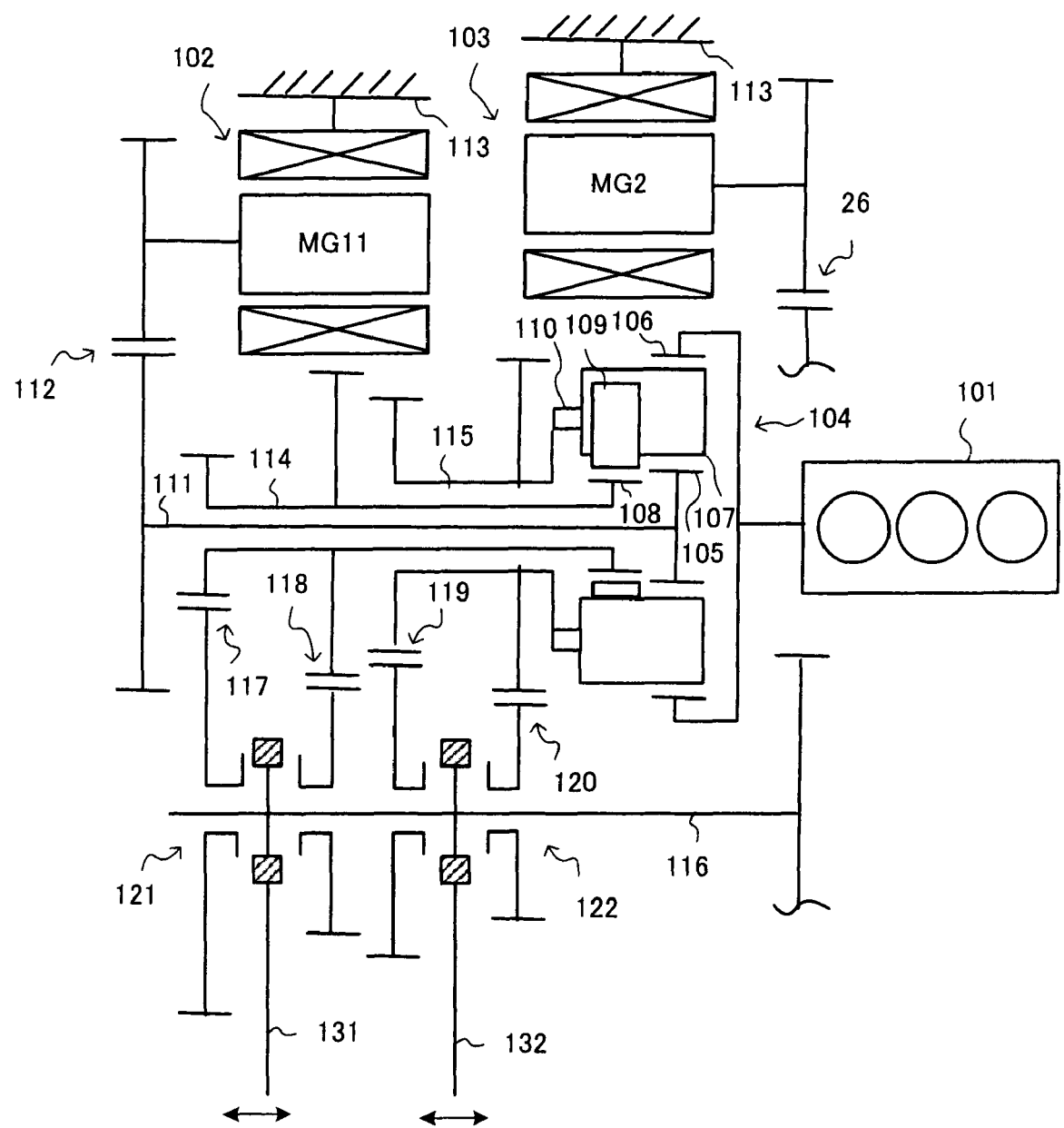
FIG. 11 shows a configuration of a control device according to another embodiment.

FIG. 11 shows an example of the control device for the hybrid vehicle according to another embodiment. In the example in FIG. 11, the hybrid vehicle includes an internal combustion (engine) 101, a first motor generator (MG1) 102 and a second motor generator (MG2) 103 as a power device. An output torque of the engine 101 is distributed to the first motor generator 102 and the output axis by a power distribution mechanism 104, and the driving torque and the braking force are assisted by the second motor generator 103. This configuration is referred to as a mechanical distribution double-motor type hybrid device.

The engine 101 is a heat engine which combusts the fuel and generates the power, such as a gasoline engine and a diesel engine. The first motor generator 102 receives the torque from the engine 101 and revolves to mainly generate the power. The reaction force torque caused by the power generation operates on the first motor generator 102.

The second motor generator 103 assists the driving torque or the braking force. When assisting the driving torque, the second motor generator 103 receives the power supply and functions as the power device. Meanwhile, when assisting the braking force, the second motor generator 103 is revolved by the torque transmitted from driving wheels (not shown), and functions as a generator which generates the power.

The power distribution mechanism 104 is formed by substantially combining two pairs of planetary gear mechanisms.

A rabinion-type planetary gear mechanism formed by combining a single-pinion-type planetary gear mechanism and a double-pinion-type planetary gear mechanism is used in the example shown in FIG. 11. Concretely, a long pinion 107, which engages with a first sun gear 105 being an external gear and a ring gear 106 being an internal gear, concentrically arranged with respect to the first sun gear 105, is arranged between the first sun gear 105 and the ring gear 106. The single-pinion-type planetary gear mechanism is formed by the first sun gear 105, the ring gear 106 and the long pinion 107. Also, a second sun gear 108 is arranged adjacent to and on the same axis line as the first sun gear 105, and a short pinion 109 engaging with the second sun gear 108 engages with the long pinion 107. Thus, the double-pinion-type planetary gear mechanism is formed by the second sun gear 108, the pinions 109 and 107 and the ring gear 106. Further, the long pinion 107 and the short pinion 109 engaging with each other are provided plural sets. By a carrier 110, the pinions 107 and 109 are held to rotate and revolve.

The torque is inputted to the ring gear 106 in the power distribution mechanism 104 from the engine 101. Therefore, the ring gear 106 is an input component.

The torque is transmitted to the first sun gear 105 in the power distribution mechanism 104 from the first motor generator 102. Thus, the first sun gear 105 is a reaction force component. Concretely, a reaction force axis 111 is arranged on the same axis line as the engine 101, and an edge portion opposite to the engine 101 of the reaction force axis 111 is connected to a rotor of the first motor generator 102 via the pair of gears 112. The stator of the first motor generator 102 is connected and fixed to a fixed portion such as a casing 113.

The above-mentioned power distribution mechanism 104 includes four components, i.e., the ring gear 106 being the input component, the first sun gear 105 being the reaction force component, the second sun gear 108 and the carrier 110, as revolution components, and the second sun gear 108 or the carrier 110 selectively functions as the output component. The three components, i.e., the ring gear 106, the first sun gear 105 or the second sun gear 108, and the carrier 110, are formed to generate the differential operation.

A synchronization connection mechanism for selectively transmitting the torque between the output component and an output member is provided therebetween. Concretely, first and second intermediate axes 114 and 115 being hollow shafts rotably engage with the outer circumferential side of the reaction force axis 111. The second intermediate axis 115 on the outer circumferential side is connected to the carrier 110. The first intermediate axis 114 on the inner circumferential side is connected to the second sun gear 108, and projects on a point side (a side opposite to the engine 101) of the second intermediate axis 115.

An output axis 116 is rotably arranged away from by a predetermined distance and in parallel with the intermediate axes 114 and 115. A first speed gear pair 117 and a third speed gear pair 118 are arranged between the first intermediate axis 114 and the output axis 116. The gear pairs 117 and 118 are arranged adjacently to each other in the direction of the axis line. In addition, a second speed gear pair 119 and a fourth speed gear pair 120 are arranged between the second intermediate axis 115 and the output axis 116. The gear pairs 119 and 120 are arranged adjacently to each other in the direction of the axis line.

The gear pairs 117 to 120 are formed by driving gears on the side of the intermediate axes 114 and 115 and dependent gears on the side of the output axis 116, always engaging with the driving gears, respectively. The dependent gears on the side of the output axis 116 of the gear pairs 117 and 118 are connected to a clutch mechanism 121, respectively. In addition, the dependent gears on the side of the output axis 116 of the gear pairs 119 and 120 are connected to a clutch mechanism 122, respectively. The clutch mechanisms 121 and 122 are formed as dog clutches for making dog teeth, arranged opposite to each other, engage with each other. Concretely, in the clutch mechanism 121, the output axis 116 engages with the dependent gear of the first speed gear pair 117 by moving an actuator 131 to the left direction in FIG. 11, and the output axis 116 engages with the dependent gear of the third speed gear pair 118 by moving the actuator 131 in the right direction in FIG. 11. Similarly, in the clutch mechanism 122, the output axis 116 engages with the dependent gear of the second speed gear pair 119 by moving the actuator 132 in the left direction in FIG. 11, and the output axis 116 engages with the dependent gear of the fourth speed gear pair 120 by moving the actuator 132 in the direction of the right direction in FIG. 11. In this manner, by driving the actuators 131 and 132, it becomes possible to choose any speed gear stage of the first speed to the fourth speed. The driving control of the actuators 131 and 132 is executed by an ECU (not shown).

In the above configuration, when any speed gear stage of the first speed to the fourth speed is chosen by the speed change mechanism, the control device operates in the infinite variable speed mode. Namely, by the power distribution mechanism 104, when the number of revolutions of the first motor generator 102 is continuously changed, the number of revolutions of the engine 101 is also continuously changed, and the operation in the infinite variable speed mode is executed. Meanwhile, at the time of changing the speed gear from the first speed to the second speed, from the second speed to the third speed, and from the third speed to the fourth speed, the plural gears are fixed to the output axis, i.e., the fixed gear ratio mode. For example, in FIG. 11, at the time of the operation in the first speed, the clutch mechanism 121 engages with the first speed gear pair 117. At the time of shifting the speed gear from the first speed to the second speed, the clutch mechanism 121 maintains the state, and the actuator 132 is driven in the left direction in FIG. 11. Thus, the clutch mechanism 122 engages with the second speed gear pair 119. At this time, temporarily, the first speed gear pair 117 and the second speed gear pair 119 are simultaneously connected to the output axis 116, i.e., the speed gear is in the fixed gear ratio mode. Similarly, at the time of shifting the speed gear from the second speed to the third speed and from the third speed to the fourth speed, the speed gear is also in the fixed gear ratio mode.

The present invention can be also applied at the time of shifting the speed gear between the infinite variable speed mode and the fixed gear ratio mode in the control device having the above configuration. Namely, when the speed gear is shifted from the infinite variable speed mode to the fixed gear ratio mode, the high revolution maintaining speed change control to maintain the number of revolutions equal to or larger than the number of engine revolutions at the time of setting the infinite variable speed mode and reduce the engine torque can be executed. Meanwhile, when the speed gear is shifted from the fixed gear ratio mode to the infinite variable speed mode, the high revolution maintaining speed change control to maintain the number of revolutions equal to or larger than the number of engine revolutions at the time of setting the fixed gear ratio mode and increase the engine torque can be executed.

What is claimed is:

1. A control device for a hybrid vehicle which comprises an engine and a motor generator as a driving source, and which switches at least two modes: an infinite variable speed mode; and a fixed gear ratio mode, comprising:

a speed change control unit which executes a speed change control that maintains a number of revolutions equal to or larger than a number of engine revolutions at a time of setting the fixed gear ratio mode, and reduces an engine torque to change to the fixed gear ratio mode, when the speed change is performed from the infinite variable speed mode to the fixed gear ratio mode in which the number of revolutions is smaller than the number of engine revolutions in the infinite variable speed mode; and a speed change determination unit which predicts a future operation state and determines whether or not to execute the speed change control based on the predicted operation state, wherein, only when the speed change determination unit determines to execute the speed change control, the speed change control unit executes the speed change control wherein, when an operation state does not become the operation state predicted by the speed change determination unit during executing the speed change control, the speed change control unit stops the execution of the speed change control, and moves an operation point of the engine on a fuel consumption optimum line and an equipower line to change to the fixed gear ratio mode.

2. The control device for the hybrid vehicle according to claim 1, wherein the speed change control unit sets the number of engine revolutions so that a difference between numbers of revolutions of engaging components used for switching the infinite variable speed mode and the fixed gear ratio mode becomes substantially 0, and executes the speed change control.

3. A control device for a hybrid vehicle which comprises an engine and a motor generator as a driving source, and which switches at least two modes: an infinite variable speed mode; and a fixed gear ratio mode, comprising:

a speed change control unit which executes a speed change control that maintains a number of revolutions equal to or larger than a number of engine revolutions of the fixed gear ratio mode before performing the speed change, and increases an engine torque to change to the infinite variable speed mode, when the speed change is performed from the fixed gear ratio mode to the infinite variable speed mode in which the number of engine revolutions is larger than the number of engine revolutions in the fixed gear ratio mode; and a speed change determination unit which predicts a future operation state and determines whether or not to execute the speed change control based on the predicted operation state, wherein, only when the speed change determination unit determines to execute the speed change control, the speed change control unit executes the speed change control, and wherein, when an operation state does not become the operation state predicted by the speed change determination unit during executing the speed change control, the speed change control unit stops the execution of the speed change control, and moves an operation point of the engine on a fuel consumption optimum line and an equipower line to change to the infinite variable speed mode.

* * * * *